US011199886B1

(12) United States Patent
North et al.

(10) Patent No.: US 11,199,886 B1
(45) Date of Patent: Dec. 14, 2021

(54) METHOD TO DYNAMICALLY BIAS CPU FREQUENCY BASED ON APPLICATION, TEMPERATURE AND ACOUSTICS AND SYSTEM THEREFOR

(71) Applicant: DELL PRODUCTS, LP, Round Rock, TX (US)

(72) Inventors: Travis North, Cedar Park, TX (US); Qinghong He, Austin, TX (US); Alex Shows, Leander, TX (US); Mitchell Markow, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/110,073

(22) Filed: Dec. 2, 2020

(51) Int. Cl.
| | | |
|---|---|---|
| *G06F 1/00* | (2006.01) | |
| *G06F 1/20* | (2006.01) | |
| *G06F 1/3296* | (2019.01) | |
| *G06F 1/3234* | (2019.01) | |

(52) U.S. Cl.
CPC ............ *G06F 1/206* (2013.01); *G06F 1/3243* (2013.01); *G06F 1/3296* (2013.01)

(58) Field of Classification Search
CPC ...................................................... G06F 1/206
See application file for complete search history.

(56) References Cited

U.S. PATENT DOCUMENTS

| | | | |
|---|---|---|---|
| 7,200,512 B2 | 4/2007 | Lalau et al. | |
| 10,705,581 B2 | 7/2020 | La Monica et al. | |
| 2017/0038806 A1* | 2/2017 | Prajapati | G06F 1/206 |
| 2017/0085098 A1* | 3/2017 | Sporck | H02J 7/02 |
| 2017/0102676 A1* | 4/2017 | Park | G06F 1/1616 |
| 2017/0220445 A1* | 8/2017 | Cunningham | G06F 11/3089 |
| 2017/0222463 A1* | 8/2017 | Pullen | H02J 7/0072 |
| 2019/0239384 A1* | 8/2019 | North | G06F 1/3206 |

* cited by examiner

*Primary Examiner* — Mohammed H Rehman
(74) *Attorney, Agent, or Firm* — Larson Newman, LLP

(57) ABSTRACT

A method for regulating power dissipation at an information handling system may include determining a present value of a first parameter, the first parameter controlling an operating frequency, frequency boost, and a supply voltage at a central processing unit. The method may further include determining a present value of a second parameter, the second parameter defining a user's preference for optimizing operation of the system for noise level, skin temperature, and performance. The method may further include determining that a program executing at the system is specified at a list of software applications. In response to determining that a skin temperature of the system exceeds a threshold, the first parameter may be adjusted to reduce power dissipation of the CPU by a first amount if the value of the second parameter is equal to a first value. The first parameter may be adjusted by a second amount if the present value of the second parameter is equal to a second value.

20 Claims, 4 Drawing Sheets

METHOD TO DYNAMICALLY BIAS CPU FREQUENCY BASED ON APPLICATION, TEMPERATURE AND ACOUSTICS AND SYSTEM THEREFOR

FIELD OF THE DISCLOSURE

This disclosure generally relates to information handling systems, and more particularly relates to dynamically biasing CPU frequency based on application, temperature and acoustics.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method for regulating power dissipation at an information handling system may include determining a present value of a first parameter, the first parameter controlling an operating frequency, frequency boost, and a supply voltage at a central processing unit. The method may further include determining a present value of a second parameter, the second parameter defining a user's preference for optimizing operation of the system for noise level, skin temperature, and performance. The method may further include determining that a program executing at the system is specified at a list of software applications. In response to determining that a skin temperature of the system exceeds a threshold, the first parameter may be adjusted to reduce power dissipation of the CPU by a first amount if the value of the second parameter is equal to a first value. The first parameter may be adjusted by a second amount if the present value of the second parameter is equal to a second value.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
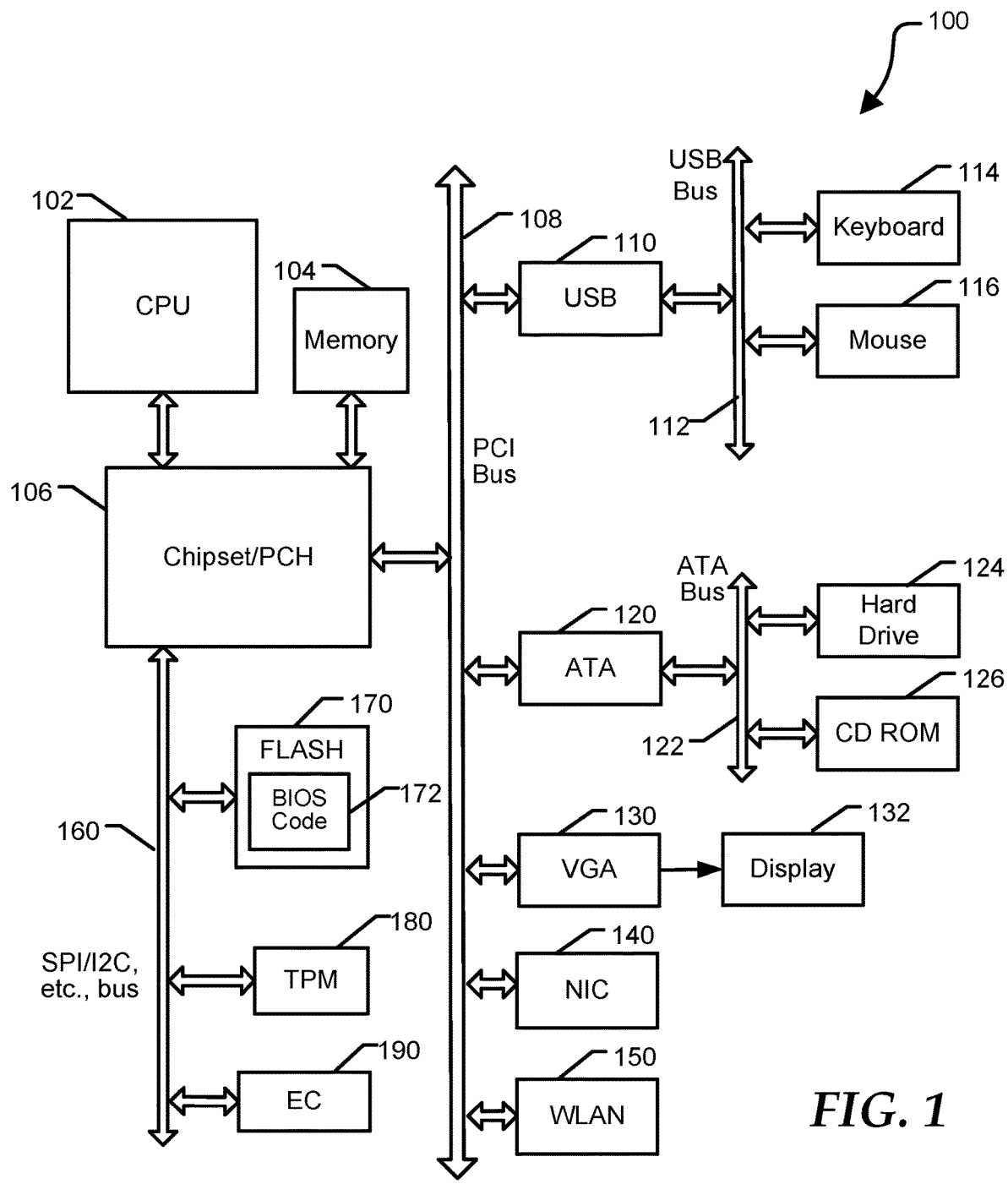
FIG. 1 is a block diagram of an information handling system according to a specific embodiment of the present disclosure.

FIG. 1 illustrates an information handling system 100 including a processor 102, a memory 104, a chipset 106, a PCI bus 108, a universal serial bus (USB) controller 110, a USB 112, a keyboard device 114, a mouse device controller 116, a high-definition (HD) camera 118, an ATA bus controller 120, an ATA bus 122, a data storage device 124, a compact disk read only memory (CD ROM) device 126, a video graphics array (VGA) device 130, a display device 132, a network interface controller (NIC) 140, a wireless local area network (WLAN) controller 150, one or more serial buses 160, a non-volatile rand access memory (NVRAM) 170 for storing a basic input/output system (BIOS) 172, a trusted platform module (TPM) 180, and an embedded controller (EC) 190.

NVRAM 170 can be referred to as a serial peripheral interface (SPI) flash storage device, BIOS SPI, and the like. TPM 180 is configured to ensure that the boot process starts from a trusted combination of hardware and software, and continues until the operating system has fully booted and applications are running. TPM 180 is compliant with an international standard for a secure cryptoprocessor, a dedicated microcontroller designed to secure hardware through integrated cryptographic keys. EC 190 can be referred to as a service processor, a baseboard management controller (BMC), and the like. EC 190 includes a processor that can operate out-of-band with respect to CPU 102. For example, remote management systems can utilize EC 190 to access components at information handling system independent of an operating state of CPU 102. EC 190 may be responsible for performing low level hardware tasks including thermal management and power management operations.

BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and OS to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device. After the initialization procedure is complete and an operating system, such as Windows, is loaded, computational operation of information handling system can begin. BIOS 172 can be substantially compliant with one or more revisions of the UEFI specification. The UEFI specification provides standard interfaces and interoperability guidelines for devices that together make up an information handling system. The UEFI specification allows for the extension of platform firmware by loading UEFI driver and UEFI application images. For example, an original equipment manufacturer can include customized or proprietary images to provide enhanced control and management of the information handling system 100.

Information handling system 100 can include additional components and additional buses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and one ore more components can be integrated together. For example, portions of chipset 106 can be integrated within CPU 102. In an embodiment, chipset 106 can include a platform controller hub (PCH). System 100 can include additional buses and bus protocols. Serial bus 160 is representative of one or more buses and/or bus protocols, such as a serial peripheral interface (SPI) bus, an inter-integrated circuit protocol (I2C) bus, a system management bus (SMB), a power management bus (PMBus), and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

Power management at an information handling system is an important activity. Power dissipation generates heat, which is typically removed from the system by cooling fans, passive heat transfer devices, or both. Fans generate noise, and heat can be uncomfortable to a user, especially at portable devices such as a laptop computer. The present disclosure is directed at improving a user's experience while operating an information handling system. In particular, specific software applications can be identified that may inherently utilize substantial hardware resources, but are capable of operating well at a reduced CPU clock frequency without significantly impacting a user's experience. Video conferencing software is one example of such an application, but the present techniques can be utilized to save power when running other identified programs.

Figure 2:
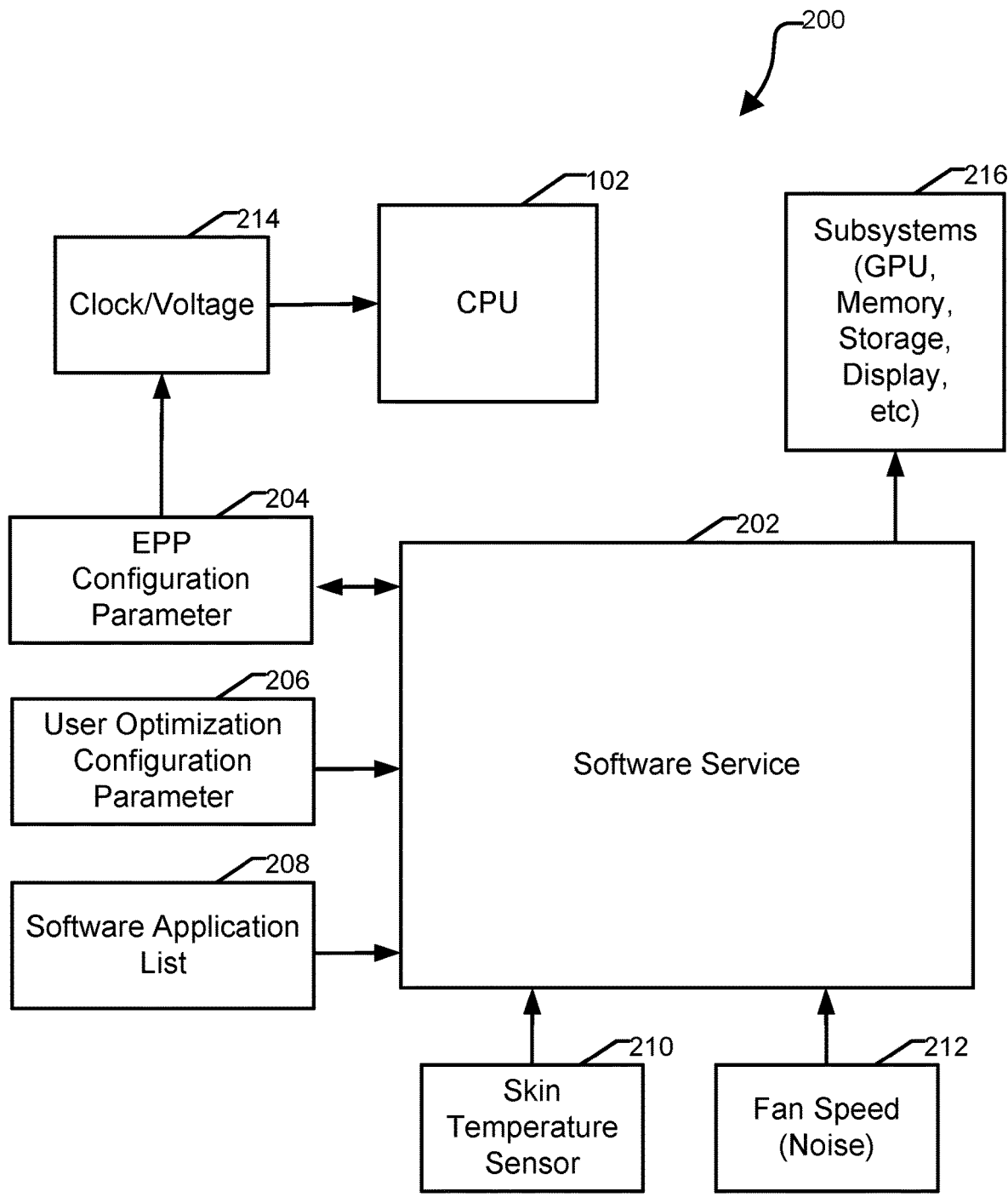
FIG. 2 is a block diagram illustrating an energy management system according to a specific embodiment of the present disclosure.

FIG. 2 shows an energy management system 200 according to a specific embodiment of the present disclosure. System 200 is configured to reduce energy consumption of information handling system 100 based on identifying specific software applications currently running at system 100. System 200 includes CPU 102, a software service 202, an energy performance preference (EPP) configuration parameter 204, a user optimization configuration parameter 206, a software application list 208, a temperature sensor 210 to monitor the skin temperature of information handling system 100, fan speed information 212, a clock and voltage controller 214, and a representation of one or more hardware subsystems 216 included at system 100. Software service 202 can be implemented as a runtime driver or by any other computational device included at system 100, such as EC 190.

EPP configuration parameter 204 can provide a means to regulate operation of CPU 102 by adjusting a base frequency of a primary clock signal at CPU 102, a boost (turbo) frequency of the primary clock signal, the rate at which the clock frequency is varied, a voltage level provided to CPU 102, and may include control of how many CPU cores are activated at a particular time. Accordingly, EPP parameter 204 can be used to configure the computational performance, and thus energy consumption, of system 100 over a range, such as from a battery-saving configuration to a high-performance configuration. The term EPP is associated with Speed Shift technology supported by processors provided by the Intel Corporation, but can be considered synonymous with the Processor Power Management (PPM) technology provided by Advanced Micro devices, or with another CPU clock and voltage control technology. For clarity, EPP configuration parameter 204 is described herein as specifying a range of CPU computational performance, from low performance/low energy to high performance/high energy. In particular, a reduction of a value of EPP parameter 204 corresponds to a reduction in the computational performance and energy consumption of CPU 102.

User optimization configuration parameter 206 provides a means for a user to specify their preferences regarding operation of system 100 that affect the user's experience. For example, user parameter 206 can offer the user choices of cool and quiet, balanced, or high performance. The user can select the cool and quiet option if low noise and low heat are the foremost consideration, high performance if computational speed is of the utmost importance, or balanced if they desire an average tradeoff between noise/power and performance. User optimization parameter 206 can include additional options that relate to a user's preferences, and may be referred to as a user-selectable thermal table, or simply as a customer mode.

Software application list 208 is configured to store the identity of specific application programs. The power control algorithm disclosed herein is only activated if system 100 is presently executing one or more software applications specified at list 208. For the purpose of example, the disclosed techniques are described below with reference to a video conference application. Skin temperature sensor 210 can include a thermal sensor proximate to an external surface of information handling system 100, such as the back surface of a laptop computer. Fan speed 212 correlates with acoustic noise generated by system 100. Subsystems 216 include components of information handling system 100 that can be configured to operate at reduced power levels. Examples of subsystem 216 can include a graphics processing unit (GPU) such as VGA 130, memory 104, data storage devices such as hard drive 124, display device 132, a charging system, and the like.

Software service 202 is configured to dynamically adjust the value of EPP parameter 204 based on the present value of EPP 204, the present value of user optimization parameter 206, and information provided by one or both of skin temperature sensor 210 and fan speed information 212, but only if system 100 is currently executing an application included at software application list 208. If system 100 is not executing an application program identified at list 208, operation of system 100 is based only on the current values of EPP parameter 204 and user optimization parameter 206. By dynamically adjusting the value of EPP parameter 204, software service 202 can regulate power consumption of CPU 102 by controlling clock/voltage controller 214. Software service 202 is also configured to reduce power consumption at one or more of subsystems 216 according to a present state of a power reduction algorithm implemented by service 202. The power reduction algorithm is described below with reference to FIGS. 3 and 4.

Figure 3:
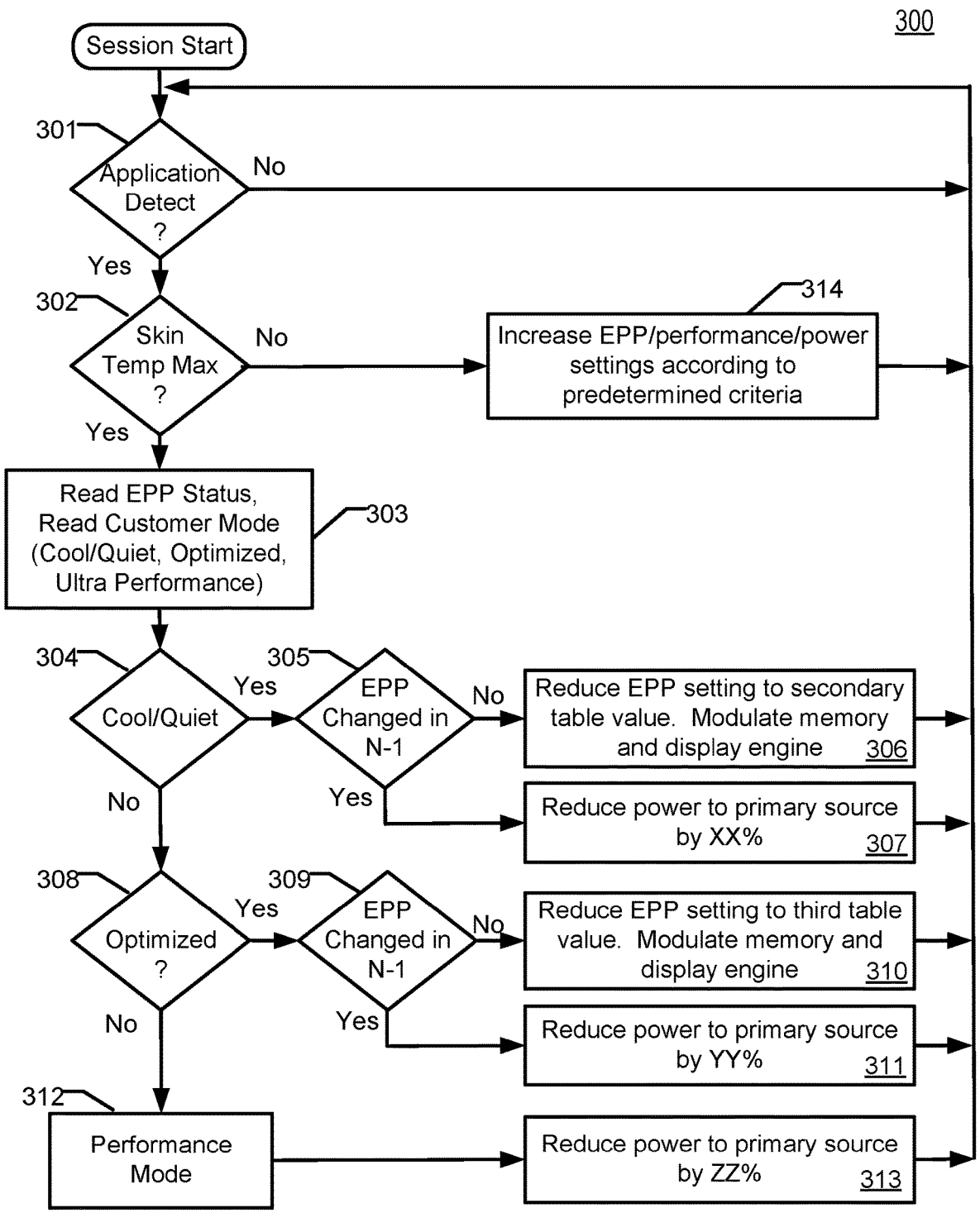
FIG. 3 is a flow diagram illustrating a method for adjusting power consumption at an information handling system according to a specific embodiment of the present disclosure.

FIG. 3 shows a method 300 for adjusting power consumption at information handling system 100 according to a specific embodiment of the present disclosure. In particular, method 300 illustrates how software service 202 can adjust EPP configuration parameter 204 by an amount that is dependent on the current state of user configuration parameter 206. Method 300 begins at decision block 301 where it is determined whether a software application executing at information handling system 100 is identified at software application list 208. If no application presently running at system 100 is found at list 208, method 300 returns to decision block 301. If a software application running at system 100 is identified on list 208, the method proceeds to decision block 302 where it is determined whether a skin temperature of system 100 exceeds a predetermined maximum temperature. The predetermined maximum temperature can be a fixed value, or the value may vary based on the state of one or more operating modes available at system 100. Furthermore, while the present example illustrates operation of method 300 with respect to skin temperature, one of skill will appreciate that an acoustic noise limit or another system parameter can be evaluated instead of, or in addition to, the skin temperature.

If the skin temperature does not exceed the predetermined maximum temperature, method 300 can return to decision block 301, or optionally to block 314 as described below. If the skin temperature does exceed the threshold, method 300 advances to block 303 where the present value of EPP configuration parameter 204 and the present value of user optimization configuration parameter 206 are determined. Based on the value of user parameter 206, method 300 proceeds to one of three blocks. If user optimization configuration parameter 206 is set to 'cool/quiet' mode, method 304 proceeds from decision block 304 to decision block 305. If user parameter 206 is set to 'optimized' mode, method 300 proceeds from decision block 308 to decision block 309. If user parameter 206 is set to 'performance' mode, method 300 proceeds from block 312 to block 313. Based on the value of user parameter 206, software system 202 can adjust EPP 204 and implement other power reduction schemes in different ways that are best suited for the current user's optimization configuration mode preference.

If user optimization parameter 206 is set to cool/quiet, decision block 305 determines whether method 300 has already reduced the value of EPP 204 in a previous iteration through block 305. If EPP parameter 204 has not been previously reduced, method 300 proceeds to block 306 where the value of EPP parameter 204 is reduced to a predetermined secondary table value. In addition, software service 202 can take addition actions to reduce power dissipation at system 100, such as reducing memory access bandwidth, reducing brightness of display 132, and the like. If EPP parameter 204 has been previously reduced in a previous iteration of method 300, the method proceeds to block 307 where software system 202 can evaluate which of subsystems 216 can be manipulated to best reduce power dissipated by that subsystem, thereby reducing total power consumption and heating at information handling system 100. For example, method 300 can reduce power consumption at system 100 by 10% by reducing power consumption at one or more of subsystems 216.

If user optimization parameter 206 is set to optimized, decision block 309 determines whether method 300 has already reduced the value of EPP 204 in a previous iteration through block 309. If EPP parameter 204 has not been previously reduced, method 300 proceeds to block 310 where the value of EPP parameter 204 is reduced to a third table value. As above, software service 202 can take addition actions to reduce power dissipation at system 100, such as reducing memory access bandwidth, reducing brightness of display 132, and the like. If EPP parameter 204 has been previously reduced, method 300 proceeds to block 311 where software system 202 can reduce power dissipated of one or more selected subsystem. For example, method 300 can reduce power consumption at system 100 by 7% by reducing power consumption at one or more of subsystems 216.

If user optimization parameter 206 is set to performance, method 300 proceeds from block 312 to block 313 where software system 202 can reduce power dissipated of one or more selected subsystem of subsystems 216. For example, method 300 can reduce power consumption at system 100 by 5% by reducing power consumption at one or more of subsystems 216.

Depending on how the user has configured user optimization parameter 206, method 300 can take remedial action that is most appropriate to maintain the user's optimization preference. Having passed through one of blocks 306, 307, 310, 311, and 313, method 300 returns to decision block 301, where the method 300 can repeat after a predetermined time has elapsed. For example, a subsequent iteration of method 300 can be delayed to give information handling system time for thermal equilibrium to be reached, such as every two minutes. Furthermore, method 300 can implement a means to increase power/performance of system 100 if the skin temperature or noise levels fall below a second predetermined level that is less than the maximum value utilized at decision block 302. For example, if the skin temperature or the acoustic level falls below the second predetermined value, the previous values of EPP parameter 204 can be incrementally restored and power reductions applied to subsystems 216 can be incrementally disabled, as shown at block 314. Method 300 can continue to monitor skin temperature sensor 210 and fan speed 212, taking remedial action if corresponding thresholds are again exceeded. In an embodiment, a second application list can be defined, the second list identifying application programs that, if also running, disable the power reduction algorithm even if an application identified at application list 208 is also running.

Figure 4:
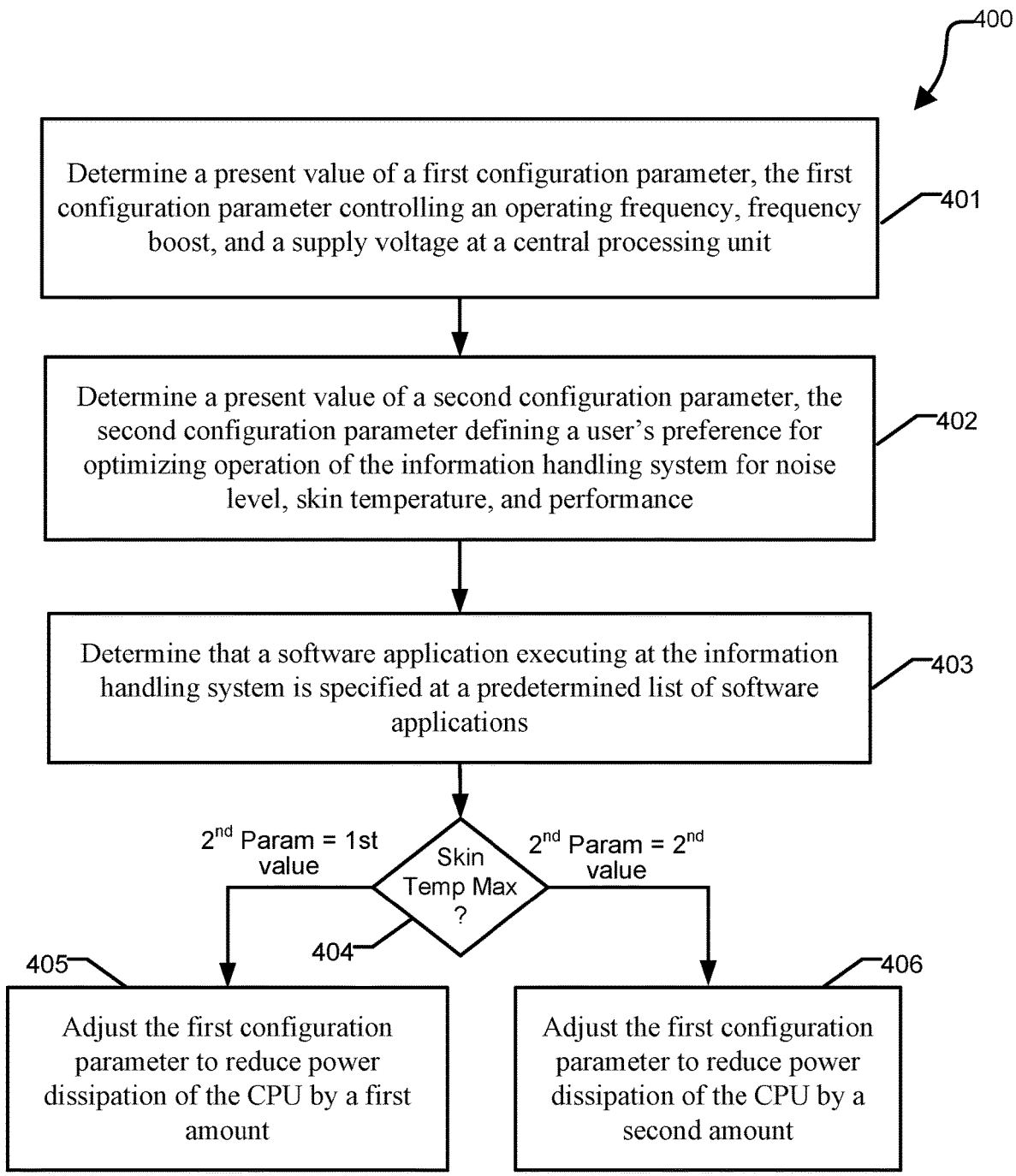
FIG. 4 is a flow diagram illustrating a method for adjusting power consumption at an information handling system according to another embodiment of the present disclosure.

FIG. 4 shows a method 400 for adjusting power consumption at information handling system 100 according to another embodiment of the present disclosure. At block 401, a present value of a first configuration parameter is determined, the first configuration parameter controlling an operating frequency, frequency boost, and a supply voltage at a central processing unit. For example, software service 202 can determine the present value of EPP configuration parameter 204. At block 402, a present value of a second configuration parameter can be determined, the second configuration parameter defining a user's preference for optimizing operation of the information handling system for noise level, skin temperature, and performance. For example, software service 202 can determine the present value of user optimization configuration parameter 206.

Method 400 continues at block 403 where software service 202 can determine that a software application executing at information handling system is specified at a predetermined list of software applications. For example, software service 202 can evaluate whether a program running at system 100 is identified at software application list 208. At decision block 404, software service 202 can determine whether an operating threshold, such as skin temperature or acoustic noise has been exceeded. If the threshold has been exceeded, method 400 diverges based on a value of the second configuration parameter. For example, if the value of user optimization parameter 206 is set to one optimization mode, method 400 completes at block 405 where the first configuration parameter (EPP 204) can be adjusted to reduce power dissipation of the CPU by a first amount. If the value of user optimization parameter 206 is set to another optimization mode, method 400 completes at block 406 where the EPP 204 can be adjusted to reduce power dissipation of the CPU by a second amount.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, such as a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for regulating power dissipation at an information handling system, the method comprising:
   determining a present value of a first configuration parameter, the first configuration parameter controlling an operating frequency, frequency boost, and a supply voltage at a central processing unit;
   determining a present value of a second configuration parameter, the second configuration parameter defining a user's preference for optimizing operation of the information handling system for noise level, skin temperature, and performance;
   determining that a software application executing at the information handling system is specified at a predetermined list of software applications; and
   in response to determining that a skin temperature of the information handling system exceeds a first predetermined value:
      adjusting the first configuration parameter to reduce power dissipation of the CPU by a first amount if the present value of the second configuration parameter is equal to a first value; and
      adjusting the first configuration parameter to reduce power dissipation of the CPU by a second amount if the present value of the second configuration parameter is equal to a second value, the second amount different than the first amount.

2. The method of claim 1, further comprising:
   reducing power dissipation at a first subsystem at the information handling system in response to determining that the adjusting of the first configuration parameter failed to reduce the skin temperature to a value below the first predetermined value.

3. The method of claim 2, further comprising reducing power dissipation at a second subsystem at the information handling system in response to determining that reduced power dissipation at the first subsystem was insufficient to reduce the skin temperature to a value below the first predetermined value.

4. The method of claim 1, further comprising not adjusting the first configuration parameter to reduce power dissipation of the CPU in response to determining that the software application is not specified at the predetermined list of software applications.

5. The method of claim 1, further comprising:
   in response to determining that the skin temperature of the information handling system does not exceed a second predetermined value, adjusting the first configuration parameter to increase power dissipation of the CPU, the second predetermined value less than the first predetermined value.

6. The method of claim 1, further comprising:
   in response to determining that the skin temperature of the information handling system exceeds the first predetermined value, adjusting the first configuration parameter to reduce power dissipation of the CPU by a third amount if the present value of the second configuration parameter is equal to a third value, the third amount different than the first and second amount.

7. The method of claim 1, further comprising:
   in response to determining that a noise level of the information handling system exceeds a second predetermined value:
      adjusting the first configuration parameter to reduce power dissipation of the CPU by a third amount if the present value of the second configuration parameter is equal to the first value; and
      adjusting the first configuration parameter to reduce power dissipation of the CPU by a fourth amount if the present value of the second configuration parameter is equal to the second value, the fourth amount different than the third amount.

8. The method of claim 7, further comprising:
   reducing power dissipation at a first subsystem at the information handling system in response to determining that the adjusting of the first configuration parameter failed to reduce the noise level to a value below the second predetermined value.

9. A method for regulating power dissipation at an information handling system, the method comprising:
   determining a present value of a first configuration parameter, the first configuration parameter controlling an operating frequency, frequency boost, and a supply voltage at a central processing unit;
   determining a present value of a second configuration parameter, the second configuration parameter defining a user's preference for optimizing operation of the information handling system for noise level, skin temperature, and performance;
   determining that a software application executing at the information handling system is specified at a predetermined list of software applications; and
   in response to determining that a noise level of the information handling system exceeds a first predetermined value:
      adjusting the first configuration parameter to reduce power dissipation of the CPU by a first amount if the present value of the second configuration parameter is equal to a first value; and
      adjusting the first configuration parameter to reduce power dissipation of the CPU by a second amount if the present value of the second configuration parameter is equal to a second value, the second amount different than the first amount.

10. The method of claim 9, further comprising:
    reducing power dissipation at a first subsystem at the information handling system in response to determining that the adjusting of the first configuration parameter failed to reduce the noise level to a value below the first predetermined value.

11. The method of claim 10, further comprising reducing power dissipation at a second subsystem at the information handling system in response to determining that reduced power dissipation at the first subsystem was insufficient to reduce the noise level to a value below the first predetermined value.

12. The method of claim 9, further comprising not adjusting the first configuration parameter to reduce power dissipation of the CPU in response to determining that the software application is not specified at the predetermined list of software applications.

13. The method of claim 9, further comprising:
in response to determining that the noise level of the information handling system does not exceed a second predetermined value, adjusting the first configuration parameter to increase power dissipation of the CPU, the second predetermined value less than the first predetermined value.

14. The method of claim 9, further comprising:
in response to determining that a noise level of the information handling system exceeds the first predetermined value, adjusting the first configuration parameter to reduce power dissipation of the CPU by a third amount if the present value of the second configuration parameter is equal to a third value, the third amount different than the first and second amount.

15. The method of claim 9, further comprising:
in response to determining that a skin temperature of the information handling system exceeds a second predetermined value:
adjusting the first configuration parameter to reduce power dissipation of the CPU by a third amount if the present value of the second configuration parameter is equal to the first value; and
adjusting the first configuration parameter to reduce power dissipation of the CPU by a fourth amount if the present value of the second configuration parameter is equal to the second value, the fourth amount different than the third amount.

16. An information handling system comprising:
a central processing unit (CPU);
a first configuration parameter to control an operating frequency, frequency boost, and a supply voltage at the CPU;
a second configuration parameter, the second configuration parameter defining a user's preference for optimizing operation of the information handling system for noise level, skin temperature, and performance; and
a software process to:
determine a value of the first configuration parameter;
determine a value of the second configuration parameter;
determine that a software application executing at the information handling system is specified at a predetermined list of software applications;
in response to determining that a skin temperature of the information handling system exceeds a first predetermined value or that a noise level of the information handling system exceeds a second predetermined value:
adjust the first configuration parameter to reduce power dissipation of the CPU by a first amount if the present value of the second configuration parameter is equal to a first value; and
adjust the first configuration parameter to reduce power dissipation of the CPU by a second amount if the present value of the second configuration parameter is equal to a second value, the second amount different than the first amount.

17. The information handling system of claim 16, further comprising:
a first subsystem,
wherein the software process is further to reduce power dissipation at the first subsystem in response to determining that the adjusting of the first configuration parameter failed to reduce the skin temperature to a value below the first predetermined value or failed to reduce the noise level to a value below the second predetermined value.

18. The information handling system of claim 17, further comprising:
a second subsystem,
wherein the software process is further to reduce power dissipation at the second subsystem at the information handling system in response to determining that reduced power dissipation at the first subsystem failed to reduce the skin temperature to a value below the first predetermined value or failed to reduce the noise level to a value below the second predetermined value.

19. The information handling system of claim 16, wherein the software process is further to not adjust the first configuration parameter to reduce power dissipation of the CPU in response to determining that the software application is not specified at the predetermined list of software applications.

20. The information handling system of claim 16, wherein the software process is further to adjust the first configuration parameter to increase power dissipation of the CPU in response to determining that the skin temperature of the information handling system does not exceed a third predetermined value and in response to determining that the noise level does not exceed a fourth predetermined value, the third predetermined value less than the first predetermined value and the fourth predetermined value less than the second predetermined value.

* * * * *